United States Patent [19]

Sommer et al.

[11] 4,045,602

[45] Aug. 30, 1977

[54] ADHESION OF ORGANOPOLYSILOXANE ELASTOMERS TO SUBSTRATES

[75] Inventors: Oswin Sommer; Peter Huber; Alois Strasser, all of Burghausen, Germany

[73] Assignee: Wacker-Chemie GmbH, Munich, Germany

[21] Appl. No.: 686,842

[22] Filed: May 17, 1976

[30] Foreign Application Priority Data

May 26, 1975 Germany .............................. 2523224

[51] Int. Cl.² .......................... B05D 1/36; B05D 7/06
[52] U.S. Cl. .................................. 427/386; 427/387; 427/407 R; 427/408
[58] Field of Search ................... 427/387, 407 R, 386, 427/408; 428/443, 447

[56] References Cited

U.S. PATENT DOCUMENTS

| 3,933,407 | 1/1976 | Tu et al. ............................ 427/387 X |
| 3,935,348 | 1/1976 | Smith ................................ 428/447 X |

Primary Examiner—James R. Hoffman

[57] ABSTRACT

A process for improving the adhesion of an organopolysiloxane elastomer to a substrate which comprises (1) coating the substrate with a copolymer containing (a) 2-hydroxypropyl acrylate and/or 2-hydroxypropyl methacrylate and (b) at least one olefinically unsaturated monomer, (2) applying a room temperature vulcanizable organopolysiloxane composition to the coated substrate and thereafter (3) curing the organopolysiloxane composition.

22 Claims, No Drawings

ADHESION OF ORGANOPOLYSILOXANE ELASTOMERS TO SUBSTRATES

The present invention relates to a process for improving the adhesion of organopolysiloxane elastomers to substrates, and more particularly to a process for improving the adhesion of organopolysiloxane elastomers to porous substrates.

Room temperature vulcanizable (RTV) organopolysiloxane compositions can be applied to substrates and vulcanized at room temperature to form organopolysiloxane elastomers thereon. The adhesion of the elastomers to the substrates can be improved by applying a primer to the substrates before applying the organopolysiloxane compositon. One primer that has been used for this purpose is a two-component epoxy resin. This has the disadvantage that the two-components can not be mixed for more than 4 hours before use. This is an obvious disadvantage, especially in regard to the expense and care that must be taken in their application.

Therefore it is an object of this invention to provide a process for improving the adhesion of organopolysiloxane elastomers to substrates. Another object of this invention is to provide a process for improving the adhesion of organopolysiloxane elastomers to porous substrates. Still another object of this invention is to provide a process for improving the adhesion of room temperature vulcanizable organopolysiloxane elastomers to substrates. A further object of this invention is to provide a primer for improving the adhesion of organopolysiloxane elastomers to substrates which may be stored for long periods of time in a form ready to use. A still further object of this invention is to provide a primer whose resistance to water and basic substances is substantailly improved over the primers known heretofore.

The foregoing objects and others which will become apparent from the following description are accomplished in accordance with this invention generally speaking, by providing a process for improving the adhesion of an organopolysiloxane elastomer to a substrate, which comprises (1) coating the substrate with a copolymer containing (a) 2-hydroxypropyl acrylate and/or 2-hydroxypropyl methacrylate and (b) at least one other olefinically unsaturated monomer, (2) applying to the coated substrate a room temperature vulcanizable organopolysiloxane composition and thereafter (3) curing the organopolysiloxane composition.

The copolymer of this invention will hereinafter be referred to as "the primer." It has the important advantage over the above described primer in that it can be stored for long periods of time in a form in which it is ready for use. Also, better adhesion of the elastomer to the substrate is obtained with this primer than when using the other primer. Moreover, resistance to water and resistance to the basic substances of the elastomer are substantially improved over the primer used heretofore. Thus, the primer of this invention can be used in conjunction with most room temperature vulcanizable organopolysiloxane compositions, irrespective of whether they form basic, neutral or acidic by-products on curing. Also the primer can be used in conjunction with those compositons which cure at room temperature in the presence of water. The primer used according to this invention has the further advantage that it can be applied even at temperatures below 10° C.

The primer may be used on substrates, preferably porous substrates in which it is desired to improve the adhesion of organopolysiloxanes. Examples of such substrates are concrete (including serated concrete), mortar, asbestos cement, gypsum, brick and wood. The present process is especially useful on alkaline substrates such as, for example, cement which is up to 30 days old and fresh mortar.

The primer used according to this invention is preferably a copolymer of 2-hydroxypropyl acrylate and vinyl chloride, and more preferably a copolymer of from 5 to 40 percent by weight of 2-hydroxypropyl acrylate and from 60 to 95 percent by weight of vinyl chloride based on the weight of the copolymer and having a K-value within the range of from 20 to 60, as measured in cyclohexanone at 20° C. (The K-value is a measure of the degree of polymerization — cf. H. Fikentscher, *Cellulosechemie*, vol. 13, 1932, pp. 58 ff.) Such copolymers are described in British Pat. No. 1,423,805.

Another primer which may be used in this invention is a copolymer containing from 4 to 36 percent by weight of 2-hydroxypropyl acrylate, up to 10 percent by weight of an olefinically unsaturated silane containing a hydrolyzable group or atom, and the remainder being vinyl chloride.

The olefinically unsaturated silane may be represented by the general formula $$RSiZ_3$$

in which R represents an omega-olefinically unsaturated monovalent organic radical and Z represents a hydrolyzable group of atom. Examples of such silanes are vinyltrialkoxysilanes, e.g., vinyltrimethoxysilane, vinyltriethoxysilane, vinyltripropoxysilane, vinyltriisopropoxysilane and vinyltributoxysilane; methacryloxypropyltrialkoxysilane, e.g., gamma-methacryloxypropyltrimethoxysilane; allyltriethoxysilane, vinyltriacetoxysilane, vinyltris(methoxyethoxy)silane, gamma-acryloxypropyltriethoxysilane and gamma-methacryloxypropyltris(methoxyethoxy)silane.

These copolymers may be manufactured by conventional techniques known in the art, such as for example by block (or "bulk"), solution, precipitation, suspension or emulsion polymerization.

It is preferred that an organosilane containing an epoxy group, an isocyanate group, or a very polar group, e.g., an amino group, or a partial hydrolysate of such a silane which is soluble in an organic solvent be used in admixture with the primer. Examples of suitable silanes are beta-(3,4-epoxycyclohexyl)ethyltrimethoxysilane, gamma-glycidoxypropyltriethoxysilane, gamma-isocyanatopropyltriethoxysilane, gamma-aminopropyltrimethoxysilane and N-beta-aminoethyl-gamma-aminopropyltrimethoxysilane. The amount of the organosilane or a partial hydrolysate thereof used is preferably not more than about 10 percent by weight, based on the weight of the primer.

In addition to the primer it is preferred that a polyacrylate or polymethacrylate be applied to the substrate. This additional polymer may be applied before, simultaneously with, or after the primer; however, it is preferred that it be applied in admixture with the primer. In any event, it should be applied prior to the application of the organopolysiloxane composition. A suitable polymethacrylate is a copolymer of butyl methacrylate and methyl methacrylate, such as is commercially available as "Plexigum PM 381" or "Plexisol PM 709" (Trademarks). The amount of addition polyacrylate or polymethacrylate used is preferably not more than about 50 percent by weight, based on the weight of the primer.

The primer and, optionally, the organosilane or its partial hydrolysate and the polyacrylate or polymethacrylate are generally applied to the substrate in the form of an anhydrous solution in an inert solvent. Suitable solvents are, for example, ethers, e.g., tetrahydrofuran; esters, e.g., ethyl acetate, butyl acetate, and acetic acid ethylene glycol ester; ketones, e.g., methylethyl ketone and methyl isobutyl ketone; and hydrocarbons, e.g., an alkane having a boiling point within the range of from 140° to 160° C at 760 torr, toluene, or a xylene. The amount of solvent in the solution is preferably from 40 to 90 percent by weight and more preferably from 60 to 80 percent by weight, based on the weight of the solution.

The solution of the primer and, optionally, the other substances may be applied to the substrate at any temperature at which it is liquid, preferably at a temperature within the range of from −20° to +40° C. It may be applied, for example, with a brush or by spraying. When the solution has been applied, the solvent is allowed to evaporate. Evaporation of the solvent may be accelerated by heating, if desired.

When the solvent has evaporated, a room temperature vulcanizable organopolysiloxane composition is applied and cured. Curing may be accelerated by heating, if desired.

Room temperature vulcanizable organopolysiloxane compositions suitable for use in the process of this invention are those that have been used theretofore to form elastomers which may be applied to substrates. Generally these organopolysiloxanes are diorganopolysiloxanes which may be represented by ther general formula

$Z'_n SiR'_{3-n} O(SiR'_2 O)_x SiR'_{3-n} Z'_n$ in which each R' represents an unsubstituted monovalent hydrocarbon radical, a substituted monovalent hydrocarbon radical, a substituted or unsubstituted polymeric hydrocarbon radical, Z' represents a hydrolyzable group, a hydrolyzable atom, a hydroxy group, or an alkenyl group, n represents 1, 2 or 3, and x represents a positive integer. The diorganopolysiloxanes may also contain, within or along the siloxane chain, a small amount of siloxane units other than the diorganosiloxane units, such as units of the formulae $R'SiO_{3/2}$, $R'_3SiO_{1/2}$ and $SiO_{4/2}$. Such units are generally present only as impurities and are preferably present in an amount less than about 10 mole percent.

Examples of unsubstituted monovalent hydrocarbon radicals represented by R' are alkyl radicals, e.g., methyl, ethyl, propyl, butyl, hexyl, and octyl radicals; alkenyl radicals, e.g., vinyl, allyl, ethallyl and butadienyl radicals; aryl radicals, e.g., phenyl radicals, and alkaryl radicals, e.g., tolyl radicals. Examples of preferred substituted monovalent hydrocarbon radicals are halohydrocarbon radicals, e.g., 3,3,3-trifluoropropyl, chlorophenyl and bromotolyl radicals; and cyanoalkyl radicals, e.g., beta-cyanoethyl radicals. Examples of unsubstituted and substituted polymeric (or "modifying") hydrocarbon radicals are homopolymeric and copolymeric chains derived from one or more olefinically unsaturated monomers, e.g., styrene, vinyl acetate, n-butyl acrylate, n-butyl methacrylate and acrylonitrile.

These polymeric radicals are linked to the silicon atom on the siloxane chain via a carbon-carbon linkage.

Preferably at least 50 percent of the radicals represented by R' are methyl radicals, since these are more readily available. Other radicals represented by R' are preferably phenyl or vinyl radicals.

In organopolysiloxane compositions which can be stored in the absence of water, but will cure at room temperature when exposed to atmospheric moisture, the atoms or groups represented by Z' are generally hydrolyzable atoms or groups. Examples of such hydrolyzable groups are amino, acylamino, aminoxy, oximo, hydrocarbonoxy, alkoxyalkoxy, acyloxy and phosphato groups. Suitable amino groups are, for example, n-butylamino, sec-butylamino and cyclohexylamino groups. An example of a suitable acylamino group is a benzoylmethylamino group. Suitable aminoxy groups are, for example, dimethylaminoxy, diethylaminoxy, dipropylaminoxy, dibutylaminoxy, dioctylaminoxy, diphenylaminoxy, ethylmethylaminoxy and methylphenylaminoxy groups. Suitable oximo groups are, for example, acetophenone oxime, acetone oxime, benzophenone oxime, methyl ethyl ketoxime, diisopropyl ketoxime and chlorocyclohexanone oxime groups. Suitable Examples of hydrocarbonoxy groups are, alkoxy groups having up to 10 carbon atoms, e.g., methoxy, ethoxy, n-propoxy, isopropoxy, butoxy, hexyloxy, heptyloxy and octyloxy groups. Other hydrocarbonoxy groups having up to 10 carbon atoms are for example, vinyloxy, allyloxy, ethylallyloxy, isopropenyloxy, butadienyloxy and phenoxy groups. A suitable alkoxyalkoxy group is, for example, a methoxyethoxy group. Preferred acyloxy groups are those having up to 18 carbon atoms, e.g., formloxy, acetoxy, propionoxy, valeroyloxy, caproyloxy, myristyloxy and stearoyloxy groups. Suitable phosphato groups are, for example, dimethylphosphato, diethylphosphato, dibutylphosphato, dioctylphosphato, methylethylphosphato, methylphenylphosphato and diphenylphosphato groups. Hydrolyzable atoms represented by Z' are, for example, hydrogen atoms and halogen atoms, such as the chlorine atom.

Alkenyl groups represented by Z' are preferably vinyl groups.

Mixtures of two or more diorganopolysiloxanes may be used in the formation of the organopolysiloxane elastomers.

The viscosity of the diorganopolysiloxanes is preferably within the range of from 100 to $10^6$ cP at 25° C.

Organopolysiloxane compositions containing diorganopolysiloxanes terminated by hydroxysiloxy groups, that is those in which Z' represents a hydroxy group (in which case n usually represents 1), also contain a crosslinking agent. The crosslinking agent is preferably a silicon compound containing at least three condensable atoms and/or groups per molecule.

A preferred crosslinking agent is a silane of the general formula

$R''_{4-t} SiZ_t$ in which R'' represents a substituted or unsubstituted monovalent hydrocarbon radical having from 1 to 18 carbon atoms and Z represents a hydrolyzable atom or group, and t represents 3 or 4.

Examples of unsubstituted monovalent hydrocarbon radicals are alkyl radicals, such as for example, methyl, ethyl, propyl, butyl, octyl, decyl and octadecyl radicals;

alkenyl radicals, such as vinyl and allyl; aryl radicals, such as the phenyl radical and alkaryl radicals, such as tolyl radicals. Examples of substituted monovalent hydrocarbon radicals are halogenated hydrocarbon radicals such as 3,3,3-trifluoropropyl, chlorophenyl and bromotolyl radicals and cyanoalkyl radicals such as the B-cyanoethyl radical.

Examples of suitable silanes represented by the above formula are methyltriethoxysilane, tetraethoxysilane, methylbutoxydiethoxysilane, methyltris(methoxyethoxy)silane, methyltriacetoxysilane, isopropyltriacetoxysilane, isopropoxytriacetoxysilane, vinyltriacetoxysilane, methyltris(diethylaminoxy)silane, methyltris(cyclohexylamino)silane, methyltris(diethylphosphato)silane, methyltris(methylethylketoximo)silane.

Another suitable crosslinking agent, which may be used instead of or in conjunction with a silane of the above formula, is a polysiloxane containing at least three silicon-bonded atoms or groups represented by Z per molecule, in which any other unsatisfied silicon valences are satisfied by siloxane oxygen atoms of, optionally, by a radical represented by R''. Examples of such crosslinking agnets are polyethylsilicate having an $SiO_2$ content of about 40 percent by weight, hexaethoxydisiloxane, and methylhydrogenopolysiloxanes.

Organopolysiloxane compositions which contain diorganopolysiloxanes in which Z' represents a hydrolyzable atom or group or a hydroxy group, also preferably contain a condensation catalyst. An example of a suitable condensation catalyst is dibutyltin dilaurate.

Organopolysiloxane compositions in which the diorganopolysiloxane is terminated by alkenyl groups also contain an organopolysiloxane having at least three silicon-bonded hydrogen atoms per molecule, such as a methylhydrogenpolysiloxane and a catalyst to promote the addition of the silicon-bonded hydrogen atoms to the alkenyl groups. A suitable catalyst for this purpose is preferably a halogen-containing platinum-siloxane complex in which the gram atom ratio of inorganic halogen to platinum is not more than 1:1. The complex is preferably an organopolysiloxane consisting of units of the formula

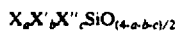

in which X represents substituted or unsubstituted monovalent hydrocarbon radicals free of unsaturation, X' represents an unsaturated monovalent hydrocarbon or halohydrocarbon radical, X'' represents an unsaturated monovalent hydrocarbon or halohydrocarbon radical bonded to a platinum atom, $a$ and $b$ each represents 0, 1 or 2, $c$ represents 0, 1, 2, or 3 and has an average value of at least 0.0002, and the sum of $a + b + c$ is 1, 2 or 3.

The organopolysiloxane composition may also contain conventional additives such as, for example, fillers, e.g., pyrogenically produced silicon dioxide (fume silica), aluminum silicates and polyvinyl chloride powder. Suitable pigments, soluble dyes, odorizers, corrosion inhibitors, plasticizers, e.g., trimethylsiloxyterminated dimethylpolysiloxanes which are liquid at room temperature adhesion promoting agents, e.g., epoxyalkylsilanes, polyglycols and etherified and/or esterified polyglycols.

The embodiments of this invention are further illustrated by the following examples in which all parts are by weight unless otherwise specified.

The organopolysiloxane compositions employed in the following examples were prepared in the following manner:

ORGANOPOLYSILOXANE COMPOSITION A

About 75 parts of a hydroxysiloxy-terminated dimethylpolysiloxane having a viscosity of 69,000 cP at 25° C, 30 parts of a trimethylsiloxy-terminated dimethylpolysiloxane having a viscosity of 32 cP at 25° C, 30 parts of aluminum silicate, 10 parts of silicon dioxide (fume silica) produced pyrogenically in the gas phase, and 4 parts of a pulverulent sodium aluminum silicate molecular sieve having a pore diameter of 4 Angstroms were mixed together. The mixture obtained was mixed, at 12 torr, with 4.2 percent based on the weight of the mixture of a liquid consisting essentially of methyltris(cyclohexylamino)silane.

ORGANOPOLYSILOXANE COMPOSITION B

About 50 parts of a hydroxysiloxy-terminated dimethylpolysiloxane having a viscosity of 350,000 cP at 25° were mixed with 15 parts of a hydroxysiloxy-terminated dimethylpolysiloxane having a viscosity of 19,000 cP at 35 parts of a trimethylsiloxyterminated dimethylpolysiloxane having a viscosity of 1000 cP at 25° C, 3 parts of a tributylphenol etherified with a polyethylene glycol containing 13 ethylene oxide units, 7 parts of silicon dioxide produced pyrogenically in the gas phase, and 25 parts of calcined aluminum silicate. The resultant mixture was then mixed with 9 parts of a mixture containing methyltris(methylethylketoximo)silane and methyltris(cyclohexylamino)silane in a 3:2 ratio and 1.5 parts of a 20 percent solution of dibutyltin dilaurate in toluene.

EXAMPLE 1

Concrete blocks, each measuring 70 mm × 15 mm × 60 mm were produced in accordance with DIN 1164 (Dec. 1958, p. 10) from a mixture containing 450 parts of cement (Portland cement strength class 350), in accordance with DIN 18540 (Oct. 1973, pamphlet 2, p. 2), 450 parts of standard sand grade I (fine), 900 parts of standard sand grade II (coarse), and 270 parts of water. The blocks were stored 7 days at 20° C and at a relative air humidity of 65 percent.

One of the following primers was then applied with a paint brush as a single coat to an area 50 mm × 15 mm on each of two blocks. This procedure was carried out at 0° C, and then repeated with another pair of blocks at 25° C. Two pairs of blocks were similarly treated with each of the other primers. All the blocks were then dried for 1 hour, except for the blocks treated with Primer D, which were dried for 2 hours in accordance with its instructions.

PRIMER A

A 30 percent solution of a copolymer consisting of 14 percent of 2-hydroxypropyl acrylate units and 86 percent of vinyl chloride units and having a K-value of 48 (measured in cyclohexanone at 20° C) in a 50:50 mixture consisting of methyl ethyl ketone and an alkane mixture having a boiling range of from 140 to 160° C at 760 torr.

PRIMER B

A 30 percent solution of a mixture consisting of 95 percent of a copolymer consisting of 20 percent of 2-hydroxypropyl acrylate units and 80 percent of vinyl chloride units having a K-value of 40 (measured in cyclohexanone at 20° C) and 5 percent of gamma-glycidoxypropyltriethoxysilane in a 50:50 mixture of methyl ethyl ketone and an alkane mixture having a boiling range of from 140° to 160° C at 760 torr.

PRIMER C

A 30 percent solution of a copolymer of 2-hydroxypropyl acrylate, gamma-methacryloxypropyltrimethoxysilane and vinyl chloride in tetrahydrofuran. The copolymer was prepared by dissolving 1 gram of $K_2S_2O_8$ with agitation, in 500 milliters of desalinated water in a 1-liter laboratory autoclave, and thereafter the autoclave was evacuated. The autoclave was heated to 60° C and then 425 grams of a mixture containing 340 grams of vinyl chloride, 63 grams of 2-hydroxypropyl acrylate and 22 grams of methacryloxypropyltrimethoxysilane and 5 grams of sodium bis(2-ethylhexyl)sulphosuccinate were introduced at a constant rate into the autoclave, under a constant pressure of 7.5 atmospheres, at the rate at which it was consumed. When the consumption of this mixture was complete and the pressure had dropped to 3.5 atmospheres, the emulsion obtained was coagulated in known manner using ionic additives. After filtering, washing and drying, a copolymer was obtained, in the form of a powder having a K-value of 48 (measured in cyclohexanone at 20° C).

For purposes of comparison, the following commercially available primers were also used in the above Example.

PRIMER D

A 50 percent solution of a commerical epoxy-resin in a 50:50 mixture of methyl ethyl ketone and xylene, in accordance with the instructions for sealing and priming concrete.

PRIMER E

A commercial primer consisting of a 40 percent solution of an organosilicon compound in acetone.

With the treated surfaces of each pair of blocks facing each other, these two surfaces were joined by a layer, measuring 50 mm × 15 mm, of organopolysiloxane composition A. The pairs of blocks were then stored for 14 days at 20° C and at a relative air humidity of 65 percent.

The entire procedure was repeated with another set of blocks. The pairs of blocks in this set were stored for 7 days in saturated calcium hydroxide solution at 23° + 1° C and then stored in air for 14 days.

EXAMPLE 2

The procedure of Example 1 was repeated except that organopolysiloxane composition B was substituted for organopolysiloxane composition A.

After the appropriate storage, the elastomeric bonding of each pair of blocks was stretched by 100 percent and this stretching was maintained for 24 hours. The adhesion of the elastomeric layer was then assessed.

The pairs of blocks on which Primers A, B and C of this invention had been applied, exhibited good adhesion in all cases, irrespective of the organopolysiloxane composition employed, the application temperature, and the method of storage. Even when the elastomeric bonding was stretched to elongation at break, only cohesive failure occured in the elastomeric layer.

Irrespective of the organopolysiloxane composition employed, the pairs of blocks treated with Primer D showed good adhesion under both storage conditions when the primer was applied at 25° C; however, when the primer was applied at 0° C, the bonding was only partial after storage in air only and nil after storage in air and water. The pairs of blocks treated with Primer E showed good bonding after storage in air only and no bonding after storage in air and water, irrespective of the application temperature and the organopolysiloxane composition used.

EXAMPLE 3

The procedure of Example 1 was repeated except that prisms of asbestos cement, or aerated cement of brick (70 mm × 15 mm × 60 mm) were substituted for the concrete blocks. Substantially the same results were achieved as were achieved in Example 1.

Although specific embodiments of the invention have been described, it should not be limited to the particular compositions described therein, but is intended to include all modifications within the spirit and scope of the appended claims.

What is claimed is:

1. A process for improving the adhesion of an organopolysiloxane elastomer to a substrate, which comprises (1) coating the substrate with a copolymer containing a compound selected from the class consisting of (a) 2-hydroxypropyl acrylate, 2-hydroxypropyl methacrylate and mixtures thereof, and (b) at least one other olefinically unsaturated monomer, (2) subsequently applying to the substrate a room temperature vulcanizable organopolysiloxane composition, and thereafter (3) curing the organopolysiloxane composition.

2. The process of claim 1, wherein the copolymer is a copolymer of 2hydroxypropyl acrylate and vinyl chloride.

3. The process of claim 1, wherein the copolymer contains from 5 to 40 percent by weight of 2-hydroxypropyl acrylate and from 60 to 90 percent by weight of vinyl chloride based on the weight of the copolymer and having a K-value within the range of from 20 to 60, as measured in cyclohexanone at 20° C.

4. The process of claim 1, wherein the copolymer contains from 4 to 36 percent by weight of b 2-hydroxypropyl acrylate, up to 10 percent by weight of an omega-olefinically unsaturated silane having a hydrolyzable group of atom, and the remainder is vinyl chloride.

5. The process of claim 4, wherein the silane has the general formula $$RSiZ_3$$

in which R represents an omega-olefinically unsaturated monovalent organic radical, and Z represents a hydrolyzable group or atom.

6. The process of claim 1, wherein the copolymer is applied in the form of an anhydrous solution in an inert solvent.

7. The process of claim 6, wherein the solution contains from 40 to 90 percent by weight of the solvent, based on the weight of the solution.

8. The process of claim 6, wherein the solution contains from 60 to 80 percent by weight of the solvent, based on the weight of the solution.

9. The process of claim 6, wherein the solution is applied at a temperature within the range of from −20° to +40° C.

10. The process of claim 1, wherein an organosilane which contains a group selected from the class consisting of an epoxy group, an isocyanate group, and an amino group, or a partial hydrolysate of said silane is applied to the substrate prior to the application of the organopolysiloxane composition.

11. The process of claim 10, wherein the organosilane is used in an amount up to 10 percent by weight, based on the weight of the copolymer.

12. The process of claim 10, wherein the organosilane is applied simultaneously with the copolymer.

13. The process of claim 1, wherein an additional polyacrylate or polymethacrylate is applied to the substrate prior to the application of the organopolysiloxane composition.

14. The process of claim 13, wherein the polymethacrylate is a copolymer of butyl methacrylate and methyl methacrylate.

15. The process of claim 13, wherein the polyacrylate or polymethacrylate is used in an amount of up to 50 percent by weight, based on the weight of the copolymer.

16. The process of claim 13, wherein the additional polyacrylate or polymethacrylate is applied simultaneously with the copolymer.

17. The process of claim 1, wherein the substrate is selected from the class consisting of concrete, mortar, asbestos cement, gypsum, brick or wood.

18. The process of claim 1, wherein the substrate is an alkaline substrate.

19. The process of claim 1, wherein the organopolysiloxane composition contains a diorganopolysiloxane having the general formula $$Z'_n SiR'_{3-n} O(SiR'_2 O)_x SiR'_{3-n} Z'_n$$

in which R' is selected from the class consisting of substituted and unsubstituted monovalent hydrocarbon radicals, monomeric and polymeric hydrocarbon radicals, Z' is selected from the class consisting of a hydrolyzable group, a hydrolyzable atom, a hydroxy group and an alkenyl group, $n$ represents 1, 2 or 3 and $x$ represents a positive integer.

20. The process of claim 19, wherein Z' represents a hydroxy group and the organopolysiloxane composition also contains a silane of the general formula $$R''_{4-t} SiZ_t$$

in which R" is selected the class consisting of a substituted and unsubstituted monovalent hydrocarbon radical having from 1 to 18 carbon atoms, Z represents a hydrolyzable atom or group and $t$ represents 3 or 4.

21. The process of claim 19, wherein Z' represents a hydroxy group, and the organopolysiloxane composition also contains a condensation catalyst.

22. The process of claim 19, wherein Z' represents an alkenyl group and the organopolysiloxane composition also contains an organopolysiloxane having at least three silicon-bonded hydrogen atoms per molecule, and a catalyst which promotes the addition of silicon-bonded hydrogen atoms to the alkenyl groups.

* * * * *